(12) United States Patent
Saxena et al.

(10) Patent No.: US 12,529,639 B2
(45) Date of Patent: *Jan. 20, 2026

(54) METHOD FOR ESTIMATING HYDROCARBON SATURATION OF A ROCK

(71) Applicant: SHELL OIL COMPANY, Houston, TX (US)

(72) Inventors: Nishank Saxena, Houston, TX (US); Faruk Ömer Alpak, Houston, TX (US); Amie Marie Hows, Houston, TX (US); John Justin Freeman, Houston, TX (US); Matthias Appel, Houston, TX (US); Ronny Hofmann, Houston, TX (US); Bochao Zhao, Houston, TX (US)

(73) Assignee: SHELL USA, INC., Houston, TX (US)

( * ) Notice: Subject to any disclaimer, the term of this patent is extended or adjusted under 35 U.S.C. 154(b) by 398 days.

This patent is subject to a terminal disclaimer.

(21) Appl. No.: 17/999,990

(22) PCT Filed: Jun. 28, 2021

(86) PCT No.: PCT/EP2021/067606
§ 371 (c)(1),
(2) Date: Nov. 28, 2022

(87) PCT Pub. No.: WO2022/002810
PCT Pub. Date: Jan. 6, 2022

(65) Prior Publication Data
US 2023/0221236 A1    Jul. 13, 2023
US 2024/0044768 A2    Feb. 8, 2024

Related U.S. Application Data

(60) Provisional application No. 63/046,063, filed on Jun. 30, 2020.

(51) Int. Cl.
*G01N 15/08* (2006.01)
*E21B 49/00* (2006.01)
(Continued)

(52) U.S. Cl.
CPC .......... *G01N 15/088* (2013.01); *E21B 49/00* (2013.01); *G01N 23/046* (2013.01);
(Continued)

(58) Field of Classification Search
CPC .. G01N 15/088; G01N 23/046; G01N 23/083; G01N 33/24; G01N 33/241;
(Continued)

(56) References Cited

U.S. PATENT DOCUMENTS 8,311,788 B2   11/2012   Hurley et al.
9,070,049 B2   6/2015    Fredrich et al.
(Continued)

FOREIGN PATENT DOCUMENTS

WO      2014142976 A1    9/2014

OTHER PUBLICATIONS

International Search Report and Written Opinion received for PCT Patent Application No. PCT/EP2021/067606, mailed on Nov. 17, 2021, 17 pages.
(Continued)

*Primary Examiner* — John Villecco
*Assistant Examiner* — Joshua B. Crockett
(74) *Attorney, Agent, or Firm* — SHELL USA, INC.

(57) ABSTRACT

The present invention provides a method for estimating hydrocarbon saturation of a hydrocarbon-bearing rock from a measurement for an electrical property a resistivity log and a rock image. The image is segmented to represent either a pore space or solid material in the rock. An image porosity is estimated from the segmented image, and a corrected porosity is determined to account for the sub-resolution (Continued)

porosity missing in the image of the rock. A corrected saturation exponent of the rock is determined from the image porosity and the corrected porosity and is used to estimate the hydrocarbon saturation. A backpropagation-enabled trained model can be used to segment the image. A backpropagation-enabled method can be used to estimate the hydrocarbon saturation using an image selected from a series of 2D projection images, 3D reconstructed images and combinations thereof.

9 Claims, 3 Drawing Sheets

(51) Int. Cl.
| | |
|---|---|
| *G01N 23/046* | (2018.01) |
| *G01N 23/083* | (2018.01) |
| *G01N 33/24* | (2006.01) |
| *G06T 7/00* | (2017.01) |
| *G06T 7/11* | (2017.01) |

(52) U.S. Cl.
CPC ........... *G01N 23/083* (2013.01); *G01N 33/24* (2013.01); *G01N 33/241* (2013.01); *G06T 7/0002* (2013.01); *G06T 7/11* (2017.01); *G01N 2015/0846* (2013.01); *G01N 2223/401* (2013.01); *G01N 2223/419* (2013.01); *G01N 2223/616* (2013.01); *G01N 2223/649* (2013.01); *G06T 2200/04* (2013.01); *G06T 2207/10081* (2013.01); *G06T 2207/20081* (2013.01); *G06T 2207/30181* (2013.01)

(58) Field of Classification Search
CPC ..... G01N 2015/0846; G01N 2223/401; G01N 2223/616; G01N 2223/649; G06T 7/0002; G06T 7/0004; G06T 7/11; G06T 2200/04; G06T 2207/10081; G06T 2207/20081; G06T 2207/30181; E21B 49/00
See application file for complete search history.

(56) References Cited

U.S. PATENT DOCUMENTS

| | | | |
|---|---|---|---|
| 9,134,457 | B2 | 9/2015 | Hurley et al. |
| 10,466,386 | B2 | 11/2019 | Hurley |
| 2011/0066404 | A1 | 3/2011 | Salazar-Tio et al. |
| 2012/0275658 | A1 | 11/2012 | Hurley et al. |
| 2013/0018641 | A1 | 1/2013 | Prisco et al. |
| 2014/0044315 | A1 | 2/2014 | Derzhi et al. |
| 2015/0043787 | A1 | 2/2015 | Fredrich et al. |
| 2018/0121579 | A1 | 5/2018 | Fredrich et al. |
| 2018/0321127 | A1 | 11/2018 | León Carrera et al. |
| 2022/0034222 | A1* | 2/2022 | Al-Ofi ................. G01V 1/50 |
| 2022/0404330 | A1* | 12/2022 | Saxena ................. G06T 7/11 |

OTHER PUBLICATIONS

Saxena et al., "Rock Properties From Micro-ct Images: Digital Rock Transforms for Resolution, Pore Volume and Field of View", Advances in Water Resources, Sep. 10, 2019, vol. 134, 13 Pages, XP085905530.
Saxena et al., "Estimating Pore Volume of Rocks From Pore-scale Imaging", Transport in Porous Media, May 11, 2019, vol. 129, Issue No. 1, pp. 403-412, XP036832637.
Archie Equation—Aapg Wiki, Mar. 26, 2015, pp. 1-3, XP055841235.
Archie, "Classification of Carbonate Reservoir Rocks and Petrophysical Considerations", Aapg Bulletin, Feb. 1, 1952, vol. 36, Issue No. 2, pp. 278-298.
Archie, "The Electrical Resistivity Log as an Aid in Determining Some Reservoir Characteristics", Transactions of the Aime, Dec. 1, 1942, vol. 146, Issue No. 1, pp. 54-62.
Garboczi, "Finite Element and Finite Difference Programs for Computing the Linear Electric and Elastic Properties of Digital Images of Random Materials", Nistir, Dec. 1, 1998, 213 Pages.
Dvorkin et al., "Etudes in Computational Rock Physics: Alterations and Benchmarking", Geophysics, vol. 77, Issue No. 3, May 2012, pp. D45-D52.
Fredrich et al., "Digital Rocks: Developing an Emerging Technology Through to a Proven Capability Deployed in the Business", Journal of Petroleum Technology, Oct. 27, 2014, pp. 2383-2399.
Andrä et al., "Digital Rock Physics Benchmarks—part II: Computing Effective Properties", Computers & Geosciences, Jan. 2013, vol. 50, pp. 33-43.
Otsu, "A Threshold Selection Method From Gray-level Histograms", Ieee Transactions on Systems, Jan. 1979, vol. Smc-9, Issue No. 1, pp. 62-66.
Saxena et al., "Effect of Image Segmentation & Voxel Size on Micro-CT Computed Effective Transport & Elastic Properties", Marine and Petroleum Geology, vol. 86, Sep. 1, 2017, pp. 972-990.
Chuang et al., "Fuzzy C-means Clustering With Spatial Information for Image Segmentation", Computerized Medical Imaging and Graphics, vol. 30, Issue No. 1, Feb. 2006, pp. 9-15.
Hilpert et al., "Pore-morphology-based Simulation of Drainage in Totally Wetting Porous Media", Advances in Water Resources, Feb.-Mar. 2001, vol. 24, Issue No. 3-4, pp. 243-255.
Alpak et al., "Direct Simulation of Pore-scale Two-phase Viscocapillary Flow on Large Digital Rock Images Using a Phase-field Lattice Boltzmann Method on General-purpose Graphics Processing Units", Computational Geosciences, Jul. 22, 2019, vol. 23, Issue No. 5, pp. 849-880.
Saxena et al., "Imaging and Computational Considerations for Image Computed Permeability: Operating Envelope of Digital Rock Physics", Advances in Water Resources, vol. 116, Apr. 4, 2018, pp. 127-144, XP085402086.
Garba et al., "Electrical Formation Factor of Clean Sand From Laboratory Measurements and Digital Rock Physics", Solid Earth Discuss, vol. 10, Issue No. 5, Sep. 9, 2019, pp. 1505-1517, XP055781308.
Amabeoku et al. "Evaluation and Application of Digital Rock Physics (Drp) for Special Core Analysis in Carbonate Formations", International Petroleum Technology Conference, Mar. 28, 2013, pp. 26-28, XP055580402.
Sudakov et al., "Driving Digital Rock Towards Machine Learning: Predicting Permeability With Gradient Boosting and Deep Neural Networks", Mar. 16, 2018, pp. 1-15, XP055678933.
Zecevic et al., "Progress in Electron Tomography to Assess the 3d Nanostructure of Catalysts", Current Opinion in Solid State and Materials Science, vol. 17, 2013, pp. 115-125.
International Search Report and Written Opinion received for PCT Patent Application No. PCT/US2019/066543, mailed on Apr. 1, 2020, 13 pages.
International Search Report and Written Opinion received for PCT Patent Application No. PCT/US2021/028299, mailed on Aug. 24, 2021, 12 pages.
Alpak et al., "Prediction of Fluid Topology and Relative Permeability in Imbibition in Sandstone Rock by Direct Numerical Simulation", Advances in Water Resources, Dec. 2018, vol. 122, pp. 49-59.
International Search Report and Written Opinion received for PCT Patent Application No. PCT/US2020/064180, Mailed on Mar. 16, 2021, 11 Pages.
Lin et al., "Quantification of Sub-resolution Porosity in Carbonate Rocks by Applying High-salinity Contrast Brine Using X-ray Microtomography Differential Imaging", Advances in Water Resources, vol. 96, Aug. 3, 2016, pp. 306-322, XP029723812.
Saxena et al., "Estimating Electrical Cemenlation and Saturation Exponents Using Digital Rock Physics", Journal of Petroleum Science and Engineering, vol. 198, Dec. 3, 2020, 11 Pages. XP086434571.

(56) References Cited

OTHER PUBLICATIONS

International Search Report and Written Opinion received for PCT Patent Application No. PCT/US2019/066539, mailed on Apr. 1, 2020, 13 pages.

* cited by examiner

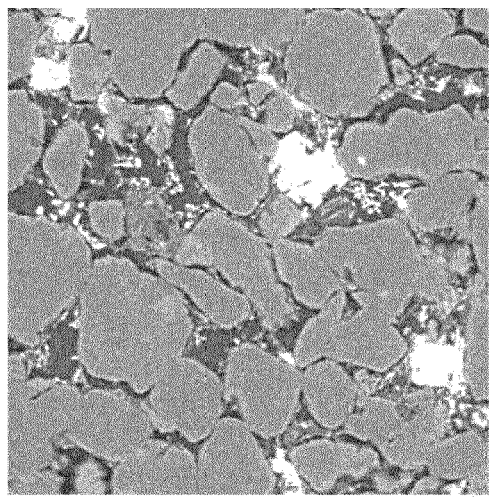 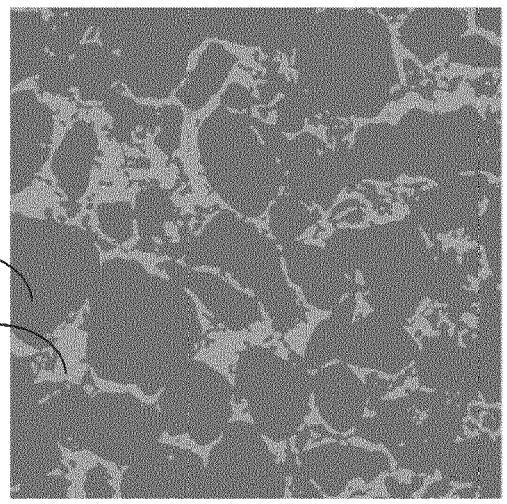
FIG. 1A  FIG. 1B
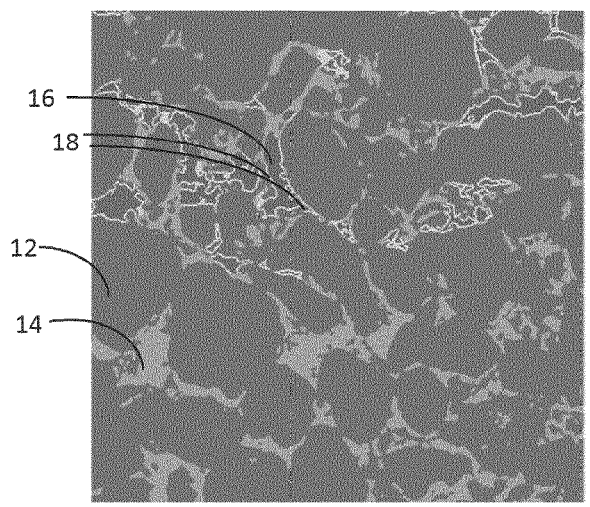 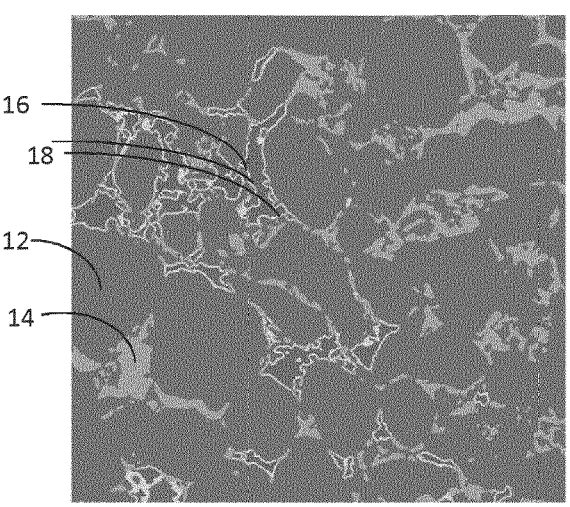
FIG. 1C  FIG. 1D

US 12,529,639 B2

METHOD FOR ESTIMATING HYDROCARBON SATURATION OF A ROCK

CROSS REFERENCE TO RELATED APPLICATIONS

This is a National stage application of International Application No. PCT/EP2021/067606, filed 28 Jun. 2021, which claims priority of U.S. Provisional Application No. 63/046,063, filed 30 Jun. 2020 which is incorporated herein by reference in its entirety.

FIELD OF THE INVENTION

The present invention relates to a method of estimating hydrocarbon saturation of a rock, and, in particular, to a method of estimating hydrocarbon saturation of a rock from a measurement for the electrical behavior of a reservoir and a 3D image of the rock.

BACKGROUND OF THE INVENTION

Accurate determination of hydrocarbon saturation within a hydrocarbon-containing reservoir is an important factor in determining whether to select the hydrocarbon-containing reservoir for development, as well as developing and managing the hydrocarbon-containing reservoir.

Petrophysical saturation models, like Archie, Waxman-Smits and other electrical conductivity models, are used to calculate the hydrocarbon saturation from a measurement for an electrical property. As these models contain empirical parameters, their accuracy typically depends on calibration against laboratory measurements using core samples.

One of such empirical parameters is Archie's saturation exponent (often referred to as Archie n). Archie's equation (Archie "Classification of Carbonate Reservoir Rocks and Petrophysical Considerations: *AAPG Bulletin* 1952; and Archie "The Electrical Resistivity Log as an Aid in Determining Some Reservoir Characteristics" *Transactions of the AIME* 146:54-62; 1942) states that the effective electrical properties of reservoir rocks are fully determined by brine conductivity, the sample's total porosity, hydrocarbon saturation and the connectivity of the pore space. The cementation exponent, often referred to as Archie-m, is typically determined by physical testing brine-saturated rock samples using laboratory measurements. The measurement of Archie n involves determining the electrical behavior of rock samples at different brine- and hydrocarbon saturations.

Such tests, however, require substantial time and are quite expensive. Further, the number of samples that may be processed is relatively limited due to the time and expense required to conduct each test. In addition, laboratory measurements typically require a standard sample size (e.g., 1 or 1.5 inch (2.5-4 cm) cylinder). Many plugs extracted using side wall coring are often not fit for these measurements but can be imaged using micro-CT for Digital Rock analysis. There is a need for providing information more quickly in order to make more timely decisions.

Digital rock physics is a technology that has been developed to provide faster, more, and less expensive analysis of hydrocarbon-containing formation rocks to determine key petrophysical characteristics of the rocks. Digital rock physics utilizes digital images of formation rocks to simulate rock multiphysics at the pore scale and to predict properties of complex rocks.

For example, U.S. Pat. No. 8,311,788B2 (Hurley et al) describes a method for quantifying pore shapes, volumes and surface areas using confocal profilometry.

U.S. Pat. No. 10,466,386B2 (Hurley) discloses methods for determining a saturation-height function in oil and gas reservoirs. The saturation-height function is determined by analyzing core samples to quantify absolute values of microporosity and calculating based on distribution of facies and microporosity that is determined as a function of height based on the absolute values. A correlation is established between the microporosity and facies. Absolute values of microporosity are determined using laser scanning confocal microscopy and/or mercury injection capillary pressure (MICP). A microporosity-weighted water saturation is determined using an Archie (n) value, determined by computing from digital models based on 3D confocal scans, to combine a water saturation value with a pore-network value and a borehole-image facies.

U.S. Pat. No. 9,134,457B2 (Hurley et al) relates to multiscale rock modeling for reservoir simulation. According to Hurley '457, pore-scale (nm to μm) digital rock modeling data is upscaled to borehole-scale (mm to m) digital rock modeling data, which is then upscaled to inter-well-scale (10's to 100's of m), which, in turn, is then upscaled to full-field-scale (10's of km) digital rock modeling data. The pore-scale digital rock modeling data includes pore geometry that is quantified by transmitted laser scanning fluorescence microscopy, micro-CT scans, nano-CT scans, focused ion beam-scanning electron microscopy, MICP, and/or nuclear magnetic resonance, using core plugs selected from gridded permeability and conventional CT scan data of core slabs. The full-field-scale digital rock modeling data is based on interwell-scale computed values, such as porosities, permeabilities, capillary pressures, resistivity indices, relative permeabilities, water saturations, irreducible water saturations, residual oil saturations, recovery factors, and Archie cementation (m) and saturation (n) exponents.

Digital Rock Physics can lead to rapid acceleration of results for upstream exploration and development projects and offers the possibility of simulating rock properties using properties of field crude and brine, as well as any digital alterations to mineral conductivity. The computed effective conductivity of a digital rock directly depends on the fraction of conductive pore space that is accessible to the simulator.

Digital rock physics modelling conventionally has relied on an assumption that the pore volume of hydrocarbon-containing rocks is accurately determined from micron-scale images. Several publications have demonstrated good agreement between laboratory-measured electrical properties and those computed using three dimensional images generated by micron-scale X-ray computer tomography (micro-CT) (Garboczi "Finite element and finite difference programs for computing the linear electric and linear elastic properties of digital images of random materials" *NISTIR* 6269; 1998; Dvorkin et al. "Etudes in computational rock physics: Alterations and benchmarking" *Geophysics* 77:3:D45-D52; May-June 2012; Fredrich et al. "Digital Rocks: Developing an emerging technology through to a proven capability deployed in the business" SPE-1070752-MS; 2014). This is especially true for rocks with large pores (e.g., Fontainebleau sandstone) because all pores can be resolved in a micro-CT image acquired with detectors that can resolve pores down to 1 micron. However, reservoir rocks often contain a significant pore volume in sub-micron size pores, and thus a significant portion of rock pore volume can remain unresolved even in images acquired with state-of-the-art detectors. The missing pore volume is not accessible to direct numerical simulations which limits applicability of Digital Rock to infer the correct m and n exponents (Andra et al. ("Digital Rock Physics Benchmarks-Part II: Computing Effective Properties" *Computers and Geosciences* 50:33-43; 2013).

For example, as discussed in Saxena et al. ("Estimating Pore Volume of Rocks from Pore-Scale Imaging" Transport in Porous Media 129: 403-412; 2019), due to current resolution limit of micron-scale images generated by micro-CT detectors, up to half of the total pore volume can be missing in micro-CT images of reservoir rocks.

There is a need for models for estimating hydrocarbon saturation based on electrical properties of the formation that include the impact of sub-resolution pore volume on effective conductivity.

SUMMARY OF THE INVENTION

According to one aspect of the present invention, there is provided a method for estimating hydrocarbon saturation of a hydrocarbon-bearing rock from a resistivity log and a rock image, comprising obtaining a measurement for an electrical property for a field having a hydrocarbon-bearing formation; obtaining a 3D image of a rock from the hydrocarbon-bearing formation in the field, wherein the 3D image is comprised of a plurality of voxels and the 3D image has a resolution; processing the 3D image to segment the 3D image by selecting each voxel of the 3D image to represent either a pore space in the rock or solid material in the rock; estimating an image porosity of the rock from the segmented 3D image, the image porosity lacking a sub-resolution porosity of the rock; determining a corrected porosity adapted to account for the sub-resolution porosity of the rock; estimating a corrected saturation exponent of the rock from the image porosity and the corrected porosity of the rock; and estimating the hydrocarbon saturation of the hydrocarbon-bearing rock using the corrected saturation exponent and the electrical property measurement.

According to another aspect of the present invention, there is provided a backpropagation-enabled method for estimating a hydrocarbon saturation of a hydrocarbon-bearing rock, comprising the steps of obtaining a measurement for an electrical property resistivity log for a field having a hydrocarbon-bearing formation; obtaining a 3D image of a rock from the hydrocarbon-bearing formation in the field, the 3D image having a resolution; applying a backpropagation-enabled trained model to segment the 3D image; estimating an image porosity of the rock from the segmented 3D image, the image porosity lacking a sub-resolution porosity of the rock; determining a corrected porosity adapted to account for the sub-resolution porosity of the rock; estimating a corrected saturation exponent of the rock from the image porosity and the corrected porosity of the rock; and estimating the hydrocarbon saturation of the hydrocarbon-bearing rock using the corrected saturation exponent and the electrical property measurement.

According to a further aspect of the present invention, there is provided a backpropagation-enabled method for estimating the hydrocarbon saturation of rock from an image of rock, comprising the steps of obtaining a measurement for an electrical property for a field having a hydrocarbon-bearing formation; obtaining an image of rock from the hydrocarbon-bearing formation in the field, the image selected from the group consisting of a series of 2D projection images, 3D reconstructed images and combinations thereof; and applying a backpropagation-enabled trained model to obtain a hydrocarbon saturation of the rock.

BRIEF DESCRIPTION OF THE DRAWINGS

The present invention will be better understood by referring to the following detailed description of preferred embodiments and the drawings referenced therein, in which:

FIG. 1A is 2D slice of a 3D micro-CT image for a rock sample, as discussed in the Example;

FIG. 1B is a segmented image of the image in FIG. 1A;

FIG. 1C is a partially saturated image of the segmented image in FIG. 1B at a first saturation;

FIG. 1D is a partially saturated image of the segmented image in FIG. 1B at a second saturation;

DETAILED DESCRIPTION OF THE INVENTION

Figure 2A:
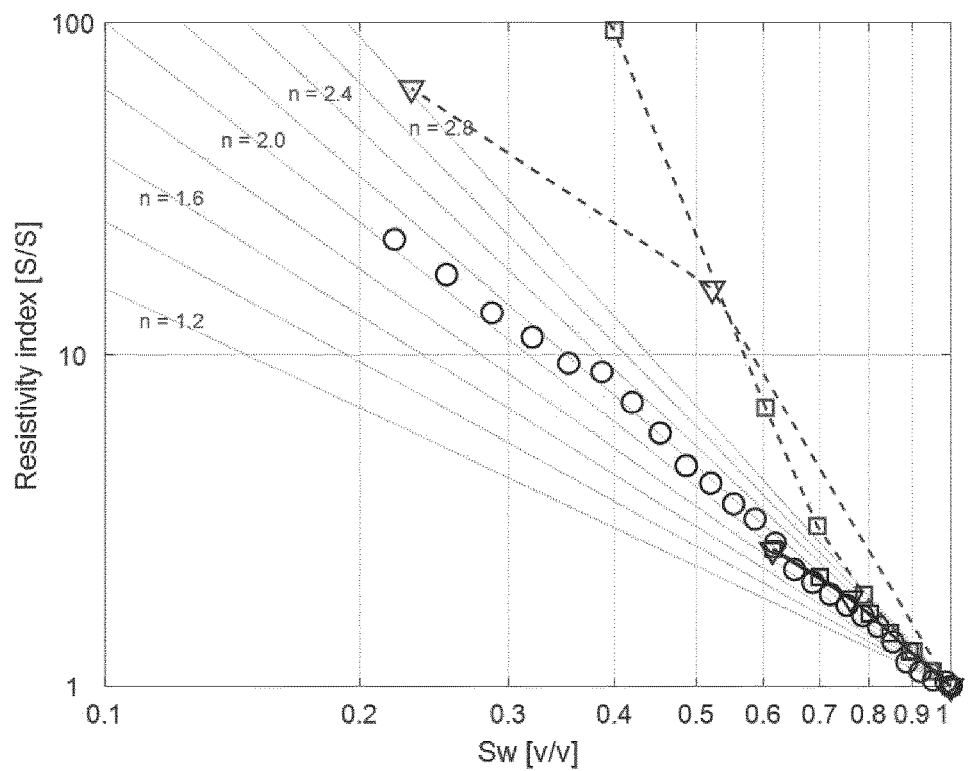
FIGS. 2A-2B are I–$S_w$ calculations for various sandstones, comparing the method of the present invention with laboratory measured properties and conventional simulations using GeoDict and eLBM.

In accordance with the method of the present invention, hydrocarbon saturation of a rock can be estimated more quickly from 3D images than conducting laboratory measurements. Specifically, the method of present invention estimates hydrocarbon saturation based on a saturation exponent, specifically Archie n, derived from direct simulations. More specifically, a meaningful estimate of the saturation exponent is determined by correcting an image-derived saturation exponent determined from micron-scale images. In a preferred embodiment, the image-derived saturation exponent is corrected for sub-resolution pore volume missing from lower resolution images.

The present inventors have surprisingly discovered that capillary physics in rocks can be used to quantify the impact of image resolution on porosity. This discovery enables Digital Rock or Digital Rock Physics to provide capability to determine a cementation exponent from 3D images of rocks generated by micro-CT technology. The inventors have discovered a method to estimate a corrected saturation exponent. Advantageously, the corrected saturation exponent, and therefore hydrocarbon saturation, compensates for the limited image resolution without the need for higher resolution imaging that is only possible at the expense of image field of view or physical laboratory measurement.

The present invention provides a method for more accurately estimating hydrocarbon saturation of a rock based on an original 3D pore-scale image of the rock having limited resolution relative to the actual pore structure of the rock. Contrary to current assumptions in digital rock physics modelling, the inventors recognized that a substantial fraction of the pore volume of hydrocarbon-containing rocks is contained in pores of a size below the image resolution provided by 3D pore-scale imaging technology commonly used to provide images of such rocks. As a result, conventional digital rock physics modelling substantially underpredicts the effective electrical conductivity of the rock by failing to account for pores that are smaller than the image resolution of the pore-scale imaging technology in the saturation exponent computation, and therefore, the hydrocarbon saturation computation.

The present invention also provides a backpropagation-enabled method for estimating the hydrocarbon saturation of rock from a 3D image of rock. A backpropagation-enabled trained model is applied to a 3D image to segment the 3D image of rock.

In a preferred embodiment, the trained model is produced by providing a training set of images of rock, segmenting the images into a plurality of labeled voxels, the plurality of labeled voxels representing pore spaces and solid material in the rock, and using the labeled voxels to train a model via backpropagation.

The training set of images of rock may include, for example, 2D projection images obtained from a pore-scale imaging technology, 3D images reconstructed from 2D projection images, synthetic 2D images, synthetic 3D images, and combinations thereof. In a preferred embodiment, the training set of images is obtained from a cloud-based tool adapted to store 2D projection images from a pore-space imaging technology, especially micro-CT and thin sections. The tool is adapted to process the 2D projection images to produce a reconstructed 3D image. The tool is also adapted to store the resulting 3D images.

Examples of backpropagation-enabled processes include, without limitation, artificial intelligence, machine learning, and deep learning. It will be understood by those skilled in the art that advances in backpropagation-enabled processes continue rapidly. The method of the present invention is expected to be applicable to those advances even if under a different name. Accordingly, the method of the present invention is applicable to the further advances in backpropagation-enabled processes, even if not expressly named herein.

A preferred embodiment of a backpropagation-enabled process is a deep learning process, including, but not limited to a convolutional neural network.

The backpropagation-enabled process may be supervised, semi-supervised, unsupervised or a combination thereof. In one embodiment, a supervised process is made semi-supervised by the addition of an unsupervised technique.

In a supervised backpropagation-enabled process, the training set of images is labeled to provide examples of pore spaces and solid material of interest. In an unsupervised backpropagation-enabled process, a pore space and/or solid material of interest may be identified by, for example, drawing a polygon around the image of interest in the image. The trained process will then identify areas of interest having similar latent space characteristics. When the training set is labeled images, the labels may have a dimension of 1D-3D.

In one embodiment, the supervised backpropagation-enabled process is a classification process. The classification process may be conducted voxel-wise, slice-wise and/or volume-wise.

In another embodiment, the unsupervised backpropagation-enabled process is a clustering process. The clustering process may be conducted voxel-wise, slice-wise and/or volume-wise.

In another embodiment, the unsupervised backpropagation-enabled process is a generative process. The generative process may be conducted voxel-wise, slice-wise and/or volume-wise.

Preferably, the backpropagation-enabled process is a segmentation process.

In a preferred embodiment, the training step includes validation and testing.

In the method of the present invention, petrophysical characteristics of a rock, particularly the hydrocarbon saturation of the rock, may be estimated from a measurement for an electrical behavior of a reservoir and an image of the rock. A measurement for an electrical property is obtained for a field having a hydrocarbon-bearing formation. The electrical property measurement is obtained in a conventional manner and form known to those skilled in the art, for example, without limitation, by measuring resistivity, induction, dielectric constant, impedance, and the like. The rock image is obtained from a rock from the hydrocarbon-containing formation for which the petrophysical characteristics of the formation, or portion thereof, are of interest. Preferably, the rock may be a sandstone, a carbonate, a shale and combinations thereof from a hydrocarbon-containing formation. The rock may be obtained by conventional means for obtaining rock samples from a hydrocarbon formation. In a preferred embodiment, a core sample of the rock is obtained by coring a portion of the formation from within a well in the formation, for example, a whole core or a sidewall core. Alternatively, a sample of the rock may be obtained from drill cuttings, preferably undisturbed drill cuttings, produced in drilling a well in the formation. The rock may be obtained from the same wellbore as the electrical property measurement. Alternatively, the rock may be obtained from another wellbore in the same field as the wellbore for which the electrical property measurement was produced.

The rock sample should be of sufficient size to obtain a 3D image of sufficient volume at the scale that the image is generated. In particular, the rock sample should be of sufficient size such that characteristics of the bulk of the sample predominate over the characteristics of the edges of the sample at the scale or field of view of the image to be generated.

A 3D image comprised of a plurality of voxels is obtained from the rock sample. The 3D image of the rock may be obtained utilizing pore-scale imaging technology. A 3D image of the rock may be obtained by x-ray computer tomography, including, without limitation, x-ray micro-computed tomography (micro-CT) and x-ray nano-computed tomography (nano-CT), acoustic microscopy, or magnetic resonance imaging. Most preferably, the 3D image of the rock is obtained by micro-CT to provide sufficient field of view of the rock to avoid edge pores distorting the overall porosity of the resulting image, as well as to reduce scanning time and computational requirements that higher resolution tomography (e.g. nano-CT) would require.

In a preferred embodiment, the 3D image is obtained from a cloud-based tool adapted to store 2D projection images from a pore-space imaging technology, especially micro-CT and thin sections. The tool is adapted to process the 2D projection images to produce a reconstructed 3D image. The tool is also adapted to store the resulting 3D images.

The 3D image of the rock obtained by pore-scale imaging technology has a resolution. The voxels of the 3D image define the resolution of the image. The image is comprised of a plurality of voxels, where the volume defined by each voxel represents a maximum resolution of the image. The resolution of the image should be selected to provide a voxel size at which the dominant pore throats for fluid flow in the rock are sufficiently resolved and at which a sufficient field of view is provided so as to be representative of the whole rock for a given petrophysical property to be analyzed (e.g. saturation exponent and hydrocarbon saturation). For purposes herein, the dominant pore throat size ($D_d$) is the size of pore throats of pores that a non-wetting liquid enters at the pore entry pressure ($P_d$), where the pore entry pressure is the minimum pressure required before the non-wetting liquid can begin to invade the pore structure of the rock.

The resolution of a micro-CT image may be chosen based on the size of the rock sample, the relative average pore size of the type of rock, the time required for the imaging, and the computational power required to store and conduct further computational activity on the image data. The image resolution is chosen to be detailed enough that a non-wetting liquid capillary injection curve can be plotted based on a segmented image produced from the image while maintaining a sufficient field of view to avoid edge pores distorting the overall porosity of the resulting image. In a preferred embodiment, the image resolution is selected to require as little computational power to store and conduct further computational activity on the image while providing sufficient detail to construct a capillary injection curve based on the segmented image. The resolution of the micro-CT image may range from 0.1 μm³ to 30 μm³ per voxel. For sandstones, the micro-CT image preferably is produced at a resolution of from 1 μm³ to 25 μm³ per voxel, or from 2.5 μm³ to 15 μm³ per voxel; for carbonates the resolution of the micro-CT image may range from 0.5 μm³ to 20 μm³, or from 1 μm³ to 10 μm³; and for shales the resolution of the micro-CT (or nano-CT) image may range from 0.1 μm³ to 10 μm³, or from 0.5 μm³ to 5 μm³.

In a preferred embodiment, the acquired image may be processed to reduce noise and image artifacts. Noise may be filtered from the acquired image by filtering using a local means filter to reduce noise. Imaging artifacts, predominant at the outer edges of the acquired image, may be reduced by processing the image while excluding the outer edges of the image.

The 3D image obtained for the rock is processed to segment the voxels of the image into voxels representing either pore space in the rock or solid material in the rock, thereby producing a binary image in which pore voxels have a value of 0 and solid material voxels have a value of 1 (or vice versa). The image may be a grayscale image, and processing the voxels of the image to segment the image into voxels representing pore space or solid material may be effected by assigning a voxel a designation as pore space or as solid material based on a threshold, wherein voxels having an image intensity above the threshold may be assigned a value representing a pore (or solid material) and voxels having an image intensity below the threshold may be assigned a value representing solid material (or a pore). A threshold may be calculated using Otsu's method as described in Otsu ("A Threshold Selection Method from Gray-level Histogram" *IEEE Trans. SMC* 9:62-66; 1979), or other threshold calculation algorithms known in the art.

The 3D image of the rock may be processed to segment the voxels into pore space voxels and solid material voxels utilizing segmentation algorithms known in the art. Preferably, the segmentation method is selected to differentiate conductive pores from non-conductive minerals. Examples of segmentation methods are described in Otsu (1979), Andra et al. ("Digital Rock Physics Benchmarks-Part II: Computing Effective Properties" *Computers and Geosciences* 50:33-43; 2013), Saxena et al. ("Effect of Image Segmentation & Voxel Size on Micro-CT Computed Effective Transport & Elastic Properties" *Marine and Petroleum Geology* 86:972-990; 2019), and Chuang et al. ("Fuzzy C-Means Clustering with Spatial Information for Image Segmentation" *Comput. Med. Imaging Graph.* 30:9-15; 2006). The desired selection of segmentation will be understood by those skilled in the art. Segmentation using segmentation algorithms is preferably conducted automatically using data processing systems.

After the image has been segmented, an image porosity, $\phi_I$, is estimated from the segmented 3D image of the rock. The image porosity of the rock may be estimated by summing the number of voxels in the segmented image that represent pore space, summing the total number of voxels in the segmented image (or obtaining the total number of voxels from the imaging parameters), then dividing the sum of the number of voxels in the segmented image that represent pore space by the total number of voxels in the segmented image. A sum of the number of voxels in the segmented image that represent pore space may be determined by adding up the number of voxels assigned a binary value (e.g. 1 or 0) representing pore space. A sum of the total number of voxels in the segmented image may be determined by adding up the total number of voxels assigned a binary value, both pore space voxels and solid material voxels. The image porosity lacks a sub-resolution porosity of the rock.

In accordance with the present invention, a corrected porosity adapted to account for the sub-resolution pore volume of the rock is determined. In one embodiment of the present invention, a corrected porosity is measured using a conventional laboratory measurement. In another embodiment of the present invention, a corrected porosity is determined by applying a correction factor to the image porosity, for example by estimating the actual porosity ($\phi_\infty$) using image-derived porosity ($\phi_I$), and an image-derived correction factor ($\alpha_R$):

$$\phi_\infty = \phi_I / \alpha_R \quad (1)$$

The correction factor may be estimated by a transform. In a preferred embodiment, the correction factor is determined by determining a non-wetting liquid capillary pressure curve from the segmented 3D image of the rock for pores distinguishable in the segmented image at pressures up to an image-limited pressure. Preferably, mercury or Wood's metal is selected as the non-wetting liquid. A non-wetting liquid capillary pressure curve may be determined from the segmented image by plotting the porosity of the rock occupied by the non-wetting liquid at selected pressures up to the image-limiting pressure based upon simulations of the non-wetting liquid filling the pore space of the image.

The expression for correction factor ($\alpha_R$) depends on the choice of Mercury Injection Capillary Pressure (MICP) model. For a Thomeer's model of the Capillary Pressure Curve, $\alpha_R$ is given by:

$$\alpha_R = e^{\frac{-G}{\log_{10}(N)}} \quad (2)$$

where G is the pore geometry factor that captures the shape of the MICP curve and N is the pore throat resolution parameter—a ratio between the entry pore throat size and image voxel size. Expressions for $\alpha_R$ can be obtained for a variety of MICP models (e.g., Brooks-Corey, Leverett J-function) known to those skilled in the art.

The pore resolution parameter N is determined from the non-wetting liquid capillary pressure curve derived from the image and the image resolution as determined from the size of the voxels. The pore resolution parameter Dd is the ratio of the pore throat size (Dd) penetrated by the non-wetting liquid at the entry pressure (Pd) to the image voxel size ($\Delta x$), $N = (Dd/\Delta x)$. The image voxel size may be determined from the parameters of the 3D imaging (i.e. the resolution of the image). The pore throat size (Dd) of pores penetrated by the non-wetting liquid at entry pressure (Pd) may be determined from the non-wetting liquid capillary pressure curve derived from the segmented 3D image of the rock according to the equation:

$$Dd = 4\sigma \cos\theta / Pd \tag{3}$$

where $\sigma$ is mercury-air surface tension and $\theta$ is the contact angle.

The pore geometry factor G is determined from the non-wetting liquid capillary pressure curve derived from the image. The pore geometry factor G may be determined by plotting a best fit curve to the non-wetting liquid capillary pressure curve simulated from the segmented image and determining the pore geometry factor from the shape of the curve. The best fit curve may be plotted by the least squares method or by any conventional curve-fitting method.

Pore geometry parameter G, which increases with pore volume complexity, is precisely 0 for pipes, approximately 0.1-0.3 for sandstones, and approximately 0.3-0.5 for carbonates. The parameters N, G, and $\alpha_R$, can also be estimated directly from a 3D image of limited resolution, without the need of a laboratory measurement, by analyzing the response of digitally simulated mercury injection.

To derive meaningful results from direct simulations, and in accordance with the present invention, raw fluid saturation inferred from simulations on micron-scale images is corrected for the missing pore volume.

The following expression relates the portion of rock pore volume occupied by mercury to the number of voxels ($\xi$) available to resolve the pore throats that were last penetrated during a MICP simulation at a given capillary pressure P:

$$\phi(\xi) = \alpha(\xi)\phi_\infty \tag{4}$$

where $$\xi = \frac{D(P)}{\Delta x} = \frac{4\sigma\cos\theta}{\Delta x P} \tag{5}$$

If all the pore throats are penetrated, then $\xi=1$ and thus the pore volume accessed by mercury will be equal to porosity of the image, i.e., $\phi(1)=\phi_I$ and $\alpha(1)=\alpha_R$. Also, when $\xi=1$, the maximum capillary pressure is reached, P=4$\sigma$ cos $\theta/\Delta x$. The expression for $\alpha(\xi)$ depends on the type of MICP model that best describes the behavior of the simulation curve. For Thomeer's MICP, functional form $\alpha(\xi)$ is given by $$\alpha(\xi) = e^{\frac{-G}{\log_{10}(N/\xi)}} \tag{6}$$

The corresponding expression for Brooks-Corey fit is expressed by $$\alpha(\xi) = 1 - \left(\frac{N}{\xi}\right)^{-\lambda} \tag{7}$$

where $\lambda$ is a fitting parameter like parameter G.

Using equation (4), the saturation of air in a MICP simulation is related to the $\xi$ value:

$$S_{wI}(\xi) = 1 - S_{nwI}(\xi) = 1 - \frac{V_{nwI}}{\phi_I} = 1 - \frac{\alpha(\xi)}{\alpha(1)} \tag{8}$$

where, $S_{wI}$ and $S_{nwI}$ are image-derived saturations for the wetting phase (air; denoted by subscript w) and non-wetting phase (mercury; denoted by subscript nw), respectively. Symbol $V_{nwI}$ denotes the fractional bulk volume occupied by mercury in the image. The corresponding expressions for fluid saturations with respect to true rock porosity ($\phi_\infty$) are given by:

$$S_{w\infty}(\xi) = 1 - S_{nw\infty}(\xi) = 1 - \frac{V_{nwI}}{\phi_\infty} = 1 - \alpha(\xi) \tag{9}$$

Equations (8) and (9) assume that the volume of non-wetting fluid estimated from direct simulations is accurate for pores and pore throats corresponding to sufficiently large values of Using these equations, the image-derived wetting fluid saturation is transformed to a corrected true wetting fluid saturation:

$$S_{w\infty} = 1 - (1 - s_{wI})\alpha_R \tag{10}$$

Equation (10) represents the inventors' recognition that image-derived properties, especially for lower resolution images, do not match those measured in the laboratory. The inventors recognized that, without correcting for missing sub-resolution porosity, because $\phi_I < \phi_\infty$, the fluid flow derived from direct flow simulation using the segmented micro-CT image is underpredicted. For rocks that contain dual pore systems, the transformed porosity $\phi_\infty$ may not capture all pores that are sub-resolution and may require further additions to account for porosity contribution from the dual pore system $\phi_{micro}$. For such cases, $\alpha_R$ can be generalized in terms of total rock porosity $\phi_T$ ($=\phi_\infty + \phi_{micro}$) for use in equation 10:

$$\alpha_R = \frac{\phi_I}{\phi_T} \tag{11}$$

If a sandstone reservoir rock (e.g., G=0.2) is moderately resolved (e.g., N=5) and the image inferred air saturation is low (e.g., $S_{wI}$=0.4), then $\alpha_R$=0.75 and thus the corrected air saturation will be $S_{w\infty}$=0.55. This illustrates that corrections to image derived fluid saturation should be made prior to comparing any simulation results with laboratory measurements. In other words, saturation $S_{w\infty}$ is comparable to laboratory measured saturation, while raw image saturation $S_{wI}$ is not.

The parameters (N, G, and $\lambda$) can be derived directly from the segmented image as described in Saxena et al. ("Estimating Pore Volume of Rocks from Pore-Scale Imaging" *Transport in Porous Media* 129: 403-412; 2019). Comparing raw MICP simulation results (image-derived fluid volumes normalized by resolved porosity in 3D images of rocks) with those measured in the laboratory can lead to false negative comparison.

Pore throats corresponding to larger values of $\xi$ are better resolved from an imaging perspective and thus also segmented with higher confidence. For any direct simulation, fluid saturation corresponding to larger values of $\xi$ will have higher fidelity compared to those estimated for lower values of $\xi$. If $\xi=2$, then only 2 voxels (in 1-dimension) are available for the non-wetting fluid to penetrate. As a result, the associated fluid volume within such poorly resolved pores will remain uncertain and thus the associated fluid distribution within these narrow pore throats will not be accurately captured by direct simulation. To ensure $\xi \geq 2$, the following inequalities need to be satisfied:

$$S_{wI} \geq 1 - \frac{\alpha(2)}{\alpha_R} \tag{12}$$

or $$S_{nwI} \leq \frac{\alpha(2)}{\alpha_R}$$

and $$S_{w\infty} \geq 1 - \alpha(2) \tag{13}$$

or $$S_{nw\infty} \leq \alpha(2)$$

Inequalities in equations (12) and (13) follow directly from the results in equations (8) and (9). Another aspect to consider prior to comparing image simulation derived wetting/non-wetting fluid (e.g., air/mercury) saturations to those measured in the laboratory is the pressure value at which the non-wetting fluid begins to enter a digital rock. In a numerical simulation, the non-wetting fluid first enters a digital rock sample via "outer" pore bodies instead of pore throats because they can be accessed at much lower pressure compared to the pore throats—compensating for the biases in pressure and volume introduced by the outer pore bodies to flow properties is referred to here as a closure correction. Although this phenomenon also occurs in a physical MICP measurement, the volumetric contributions of the outer pore body is negligible compared to the total volume of the non-wetting fluid injected in the physical sample simply due to considerably larger sample size. Therefore, in a primary drainage simulation, pressure and flow data are only meaningful after the outer pore bodies are filled with the non-wetting fluid (e.g., mercury). This condition is guaranteed if:

$$S_{wI} \leq 1 - \frac{V_{closure}}{\phi_I} \tag{14}$$

or $$S_{nwI} \geq 1 - \frac{V_{closure}}{\phi_I}$$

and $$S_{w\infty} \leq 1 - \frac{V_{closure}}{\phi_\infty} \tag{15}$$

or $$S_{nw\infty} \geq 1 - \frac{V_{closure}}{\phi_\infty}$$

The saturation cutoffs in equations (12) and (13) are related to image voxel size, namely, the finer the voxel size, the larger the parameter N, and thus less restrictive the cutoffs. Meanwhile, the saturation cutoffs in equations (14) and (15) are related to field of view, wherein the larger the field of view, the smaller the value of $V_{closure}$ and, thus less restrictive the cutoffs.

In another embodiment, the image resolution related saturation cutoffs, in equations (11) and (12), could be relaxed by re-imaging the rock sample at a finer voxel size. However, this would further restrict the saturation cutoffs related to field of view because state-of-the-art micro-CT detectors can only capture a limited number of voxels (typically fewer than 5000×5000×5000 voxels) and can only image at finer voxel size (thus increasing the value of parameter N) at the expense of field of view (resulting in larger value of $V_{closure}$). The parameters N, G, and $\alpha_R$, can also be estimated directly from a 3D image of limited resolution, without the need of a laboratory measurement, by analyzing the response of digitally simulated mercury injection as described in Saxena et al. ("Estimating Pore Volume of Rocks from Pore-Scale Imaging" Transport in Porous Media 129: 403-412; 2019). Typical $\alpha_R$ values are in a range from 0.5 to 1.

The corrected porosity is substantially the same as the true porosity determined with laboratory measurements.

As mentioned above, Archie's equation (Archie, 1942, 1952) states that the effective electrical properties of reservoir rocks are fully determined by brine conductivity, the sample's total porosity and the connectivity of the pore space. For rocks completely devoid of conductive clays or minerals, Archie's equation (Archie, 1942) can be written as $$C_T = C_w \phi_T^m S_w^n \tag{16}$$

wherein $C_T$ is effective conductivity of the fluid-saturated rock, $C_w$ is conductivity of the conductive brine in rock pores, $\phi_T$ is total porosity of the rock, and $S_w$ is saturation of the brine in the rock (i.e., ratio of volume of brine and volume of all pores).

There are two empirical parameters in Archie's equation: the first parameter, exponent m, is referred to as Archie's cementation exponent. This exponent is typically inferred using laboratory measurements of effective electrical conductivity of the rock when it is fully saturated with brine ($C_T = C_0$ when $S_w = 1$), total porosity of the rock, and conductivity of the brine, often expressed in terms of the so-called formation factor (FF):

$$FF = \frac{C_w}{C_0} = \phi_T^{-m} \tag{17}$$

The second parameter, exponent n, is the so-called saturation exponent, which relates the relative increase in the effective resistivity (1/conductivity) of the fluid-saturated rock or resistivity index I, to reduction in water saturation $S_w$:

$$I = \frac{C_0}{C_T} = S_w^{-n} \tag{18}$$

Laboratory measurements conducted to infer exponent n are often referred to as I–$S_w$ measurements. These measurements involve injection of non-conductive hydrocarbons to displace conductive water. Conventional I–$S_w$ measurements span over a period of several weeks to months.

Based on the inventors' recognition that image-derived properties, especially for lower resolution images, do not match those measured in the laboratory, the right-hand side of Archie's equation (16) can be rewritten using equations (10) and (11) as follows:

$$C_w \phi_T^m S_w^n = C_w (\phi_I/\alpha_R)^m (1-(1-S_{wI})\alpha_R)^n \tag{19}$$

Similarly, the left-hand side of Archie's equation (16) can be written as $$C_T = C_{TI} + \Delta C_{TI} \tag{20}$$

where $C_{TI}$ is the effective electrical conductivity of a segmented micro-CT image that is partially saturated with brine of conductivity $C_w$. $C_{TI}$ can be computed using a numerical simulator of electrical conductivity. The correction term $\Delta C_{TI}$ is the contribution of the missing sub-resolution pore volume based on the volume of missing porosity (i.e., $\phi_T-\phi_I$) and saturation of brine in the rock. The following empirical functional form can be assumed for the correction term $\Delta C_T$:

$$\Delta C_{TI} = C_w(\phi_T-\phi_I)^k S_w^p \tag{21}$$

where, k and p are coefficients. In a special case where all pores are completely saturated with brine (i.e., $S_w=1$), the term $(\phi_T-\phi_I)^k$ compensates for the underprediction of effective electrical conductivity, estimated using the segmented micro-CT image, due to missing sub-resolution porosity in the micro-CT image. While the exact functional form of coefficient k is not straightforward and depends on details of microstructure, it is possible to infer its value under specific limits. For example, as $\alpha_R$ approaches zero, $C_{0I}$ approaches zero, and thus the conductivity correction term $\Delta C_{0I}$ will approach the true rock conductivity, i.e., $C_w (\phi_T-\phi_I)^k \to C_w \phi_T^m$ and the coefficient k will approach the value of the cementation exponent m. Similarly, if $\alpha_R \to 1$ then $\phi_I \to \phi^T$ and the only pores that would remain unresolved would be near the grain contacts and thus will probably be crack-like or have very small aspect ratios, and so the exponent k will approach a value of 1, namely $k_0$. The exact value of $k_0$ will depend on the details of microstructure. Coefficient k has a near linear relation with $\alpha_R$. Accordingly, $$k=(k_0-m)\alpha_R+m, \text{ where } k_0=0.9 \tag{22}$$

Similarly, to estimate coefficient p, consider the special case where $\alpha_R$ approaches zero, which guarantees that $C_{TI}$ approaches zero, and thus the conductivity correction term $\Delta C_{TI}$ will approach the true rock conductivity, i.e., $C_w (\phi_T-\phi_I)^k S_w^p \to C_w \phi_T^m S_w^n$ and the exponent p will approach the value of saturation exponent n. In the special case, as $\alpha_R \to 1$, $p \to p_0$, we assume p as a linear function of $a_R$ as:

$$p=(p_0-n)\alpha_R+n \tag{23}$$

The exact value of $p_0$ will depend on the details of microstructure. Expressions for coefficients k and p are applicable as long as the correction term $\Delta C_{TI}$ does not exceed the numerically estimated electrical conductivity of segmented image $C_{TI}$, which condition is guaranteed to be satisfied if $$C_w(\phi_I/\alpha_R)^m(1-(1-S_{wI})\alpha_R)^n > C_w(\phi_I/\alpha_R-\phi_I)^k S_w^p \tag{24}$$

The condition in equation (24) is readily satisfied for rocks that have moderate exponents (i.e., m, n<3). The condition can also be met for complex rocks that have large exponents by re-imaging the rock at a higher resolution (i.e., finer voxel size for larger m<3).

If $S_w=1$, equations (19) and (20) reduce to:

$$C_0 = C_{0I} + \Delta C_{0I} = C_w(\phi_I/\alpha_R)^m \tag{25}$$

where $$\Delta C_{0I} = C_w(\phi_T-\phi_I)^k \tag{26}$$

and $C_{0I}$ is the effective electrical conductivity of a segmented micro-CT image that is completely saturated with brine of conductivity $C_w$. The Formation Factor (FF) and Resistivity Index (I) can be expressed as:

$$FF = \frac{FF_I}{1+FF_I(\phi_T-\phi_I)^k} = \phi_T^{-m} \tag{27}$$

-continued $$I = \frac{I_I + I_I FF_I(\phi_T-\phi_I)^k}{1+I_I FF_I(\phi_T-\phi_I)^k S_w^p} = S_w^{-n} \tag{28}$$

where $FF_I$ and $I_I$ are image-derived Formation Factor and Resistivity Index, respectively, given by:

$$FF_I = \frac{C_w}{C_{0I}} = \phi_I^{-m_I} \tag{29}$$

and $$I_I = \frac{C_{0I}}{C_{TI}} = S_{wI}^{-n_I} \tag{30}$$

Hydrocarbon saturation can then be estimated by calculating water saturation. Archie's equation is expressed as follows:

$$S_w^n = \frac{R_w}{(\phi^m \times R_t)} \tag{31}$$

where $S_w$ is water saturation of an uninvaded zone, n is a saturation exponent (Archie n), $R_w$ is the formation water resistivity, $\phi$ is porosity, m is the cementation exponent (Archie m), and $R_t$ is the true resistivity of the formation, corrected for invasion, borehole, thin bed and other effects. Hydrocarbon saturation is 1 minus the water saturation value.

The $R_w$ can be determined by log or physical measurement methods known to those skilled in the art. Archie m can be determined by conventional lab measurement or by estimating according to Archie's guidance (for example, as discussed at https://wiki.aapg.org/Archie_equation). In another embodiment, the cementation exponent can be determined according to the method described in U.S. Provisional Application 62/947,091 filed 12 Dec. 2019.

Preferably, the estimated hydrocarbon saturation is used to convert the electrical property measurement to a continuous saturation profile, in a manner known to those skilled in the art, for example, using a density log or other measurement of formation porosity along the well bore for the field from which the electrical property measurement was obtained. More accurate estimations of hydrocarbon saturation, as well as continuous saturation profiles derived therefrom, are particularly suitable for exploration and production decisions, and field appraisals. The method of the present invention enables quick decision-making and/or with non-standard rock sample sizes. For example, a process for estimating hydrocarbon saturation using physical measurements of a rock sample may take in the order of 7 to 8 months, while the method of the present invention can provide substantially the same or better accuracy in a matter of days. The method of the present invention can also be practiced with rock samples that cannot be used in typical laboratory measurements that require a standard sample size (e.g., 1 or 1.5 inch (2.5-4 cm) cylinder).

EXAMPLE

The following non-limiting example of an embodiment of the method of the present invention as claimed herein is provided for illustrative purposes only.

True saturation exponents were determined in a physical laboratory using laboratory measured electrical conductivity of the rock, laboratory measured porosity, and conductivity of brine saturating pores of different rock types. The true saturation exponents were calculated from equation (16).

FIG. 1A illustrates a 2D slice of a 3D micro-CT image for a rock sample. A sample was scanned at an appropriate resolution (voxel size of 1-2 microns) on a Zeiss Versa 520™ scanner. Projections were reconstructed into an approximate $2000^3$ micro-CT volume using the vendor-provided reconstruction software. The volume was then run through a non-local means filtering tool. The filtered image was then cropped down to the desired $1300^3$ dimensions to eliminate edge artifacts created by the reconstruction and the filtering tool. The cropped volume was then viewed by an expert in order to collect cluster centers to generate a 5-phase segmented image volume, with the 0-phase representing the pore space. A bimodal segmentation was generated, as illustrated in FIG. 1B, by assigning all non-zero phases to the 1 phase which is intended to represent impermeable solids. As a result, the dark gray sections 12 represent minerals, while the lighter gray portions represent pore spaces 14.

For I–$S_w$ computations, partially hydrocarbon saturated volumes were generated from the segmented image in FIG. 1B, using drainage simulators, discussed below. FIGS. 1C and 1D illustrate hydrocarbons 16 that have partially saturated the pores illustrated in dark gray surrounded by a thin film of brine 18, shown in bright gray. The presence of hydrocarbons 16 and the thin film of brine are best illustrated by comparison with FIG. 1B.

The drainage simulations were computed using two different simulators: 1) morphological approach proposed by Hilpert et al. ("Pore-morphology-based simulation of drainage in totally wetting porous media" *Advances in Water Resources* 24:3-4:243-255; 2001) implemented in commercially available software GeoDict™, and 2) eLBM method proposed by (Alpak et al., "Direct simulation of pore-scale two-phase visco-capillary flow on large digital rock images using a phase-field lattice Boltzmann method on general-purpose graphics processing units" *Computational Geosciences* 2019). The two simulation workflows do not assume specific I–$S_w$ model behavior between resistivity index and brine saturation values (e.g., Archie's assumption of linear I–$S_w$ in log-log space).

For the GeoDict™ drainage flow simulation, the inputs are listed in Table I. While the drainage flow simulation was running, the original volume with the entire pore structure saturated with brine was prepared for the conductivity simulation. The dimensions were cropped down by 2 voxels from each side resulting in a $1296^3$ volume in order to remain consistent with the other conductivity simulations.

TABLE I

| Property | Value |
| --- | --- |
| Material Mode | Constant Contact Angle |
| Surface Tension | 0.025 N/m |
| Invading Fluid | Hydrocarbon (Non-Wetting Phase) |
| Replaced Fluid | Brine |
| Contact Angle (Wetting Phase) | 40° |
| Wetting Model | Drainage Process (NWP-Reservoir, Drainage I) |
| Boundary Conditions | WP Reservoir: Z– NWP Reservoir: Z+ Symmetric: X–, X+, Y–, Y+ |
| Step Size | 0.25 Voxel |
| Neighborhood Mode | Face, Edge or Vertex |

After the drainage flow simulation ends, a list of Wetting Phase (WP) saturations that coincided with the saturations files was available in the result file from Geodict™ Calculations were done to assess the maximum and minimum valid saturations that could be considered of sufficient quality. From 5-10 saturations were then selected at even intervals to be run through conductivity simulations. For all selected volumes, a thin film of brine was then generated using the Geodict™ dilate tool to grow 2 voxels of a new "film" phase into the hydrocarbon from the minerals/hydrocarbon boundaries. Then to remove undesired effects of the dilation, all volumes were cropped to $1296^3$ volumes like the fully WP saturated volume. The electrical conductivity of the 2-voxel thick brine thin film was related to the assumed physical thickness of the thin film ($\Delta x_{tf}$=50 nm) and voxel size ($\alpha x$):

$$C_{tf} = C_w \frac{\Delta x_{tf}}{\Delta x} \frac{1}{2} \tag{32}$$

With respect to the eLBM drainage simulation, the same steps were followed as described above for the Geodict™ tool, up to the point where the bimodal segmented volume was generated. Instead for eLBM, the volume was then cropped to fit within the limited resources required to run eLBM (the multi-phase flow algorithm). The minimum REV (representative elementary volume) is calculated based on the effective grain size and the voxel size (Saxena et al. "Imaging & computational considerations for image computed permeability: operating envelope of digital rock physics" *Advances in Water Resources* 116: 127-144, 2018). The resulting saturation volumes were then collected along with the original volume and passed through the same electrical simulations done to the full $1300^3$ volumes as for GeoDict™, including the step of adding a brine film. The volumes were cropped down 2 voxels from each edge (i.e. a $460^3$ minimum REV should have $456^3$ sized volumes run through electrical simulations).

Figure 2B:
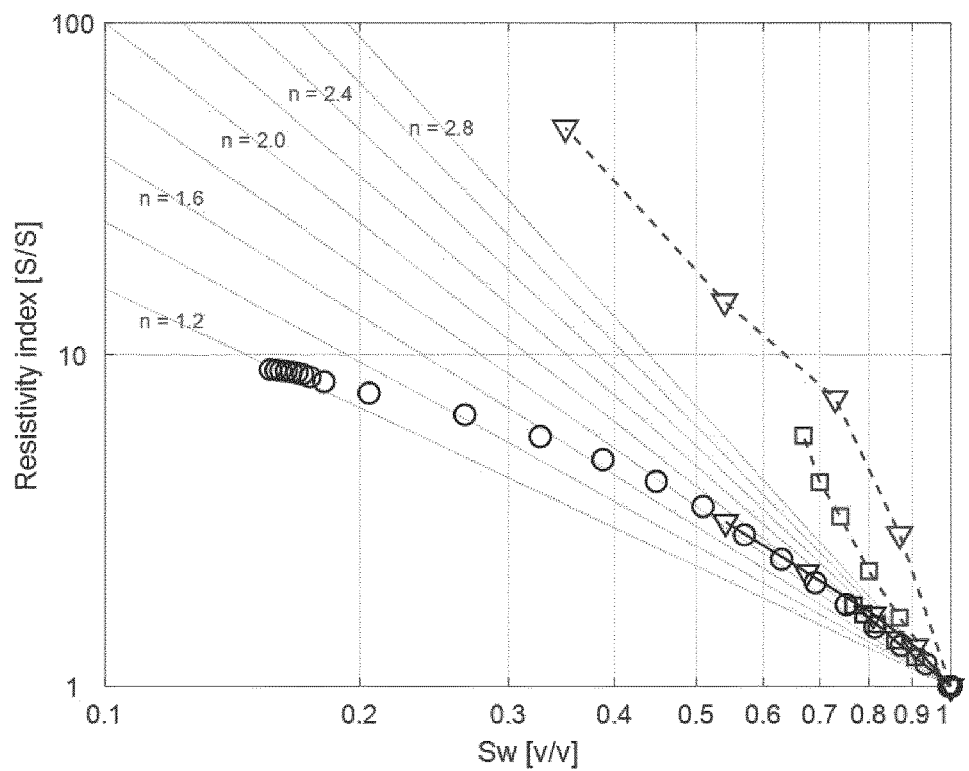

The partially saturated volumes generated in the GeoDict™ and eLBM drainage were then run through electrical conductivity simulations to compute a resistivity index $I_t$ and associated brine saturation $S_{wt}$. Brine saturations were then corrected using equation (10), and resistivity index was corrected using equations (18) and (23). Results were calculated for all three flow directions, but the results for the corrected saturations were compared with those measured in the laboratory in the same direction the measurements in the laboratory were performed for a variety of sandstones. The results are shown in FIGS. 2A-2B and compared to the uncorrected results from GeoDict™ and eLBM workflows on the same initial segmented images. Circles depict the laboratory measured properties. Dashed curves are the results of simulations of image-computed properties with eLBM (squares) and GeoDict™ (triangles). Full curves illustrate simulation with eLBM (squares) and GeoDict™ (triangles), corrected for the pores that are smaller than the image resolution of the pore-scale imaging technology, in accordance with the method of the present invention. FIGS. 2A-2B show that, upon transform, both simulations lead to consistent I–$S_w$ curves when compared to laboratory measurements.

Figures 3A, 3B:
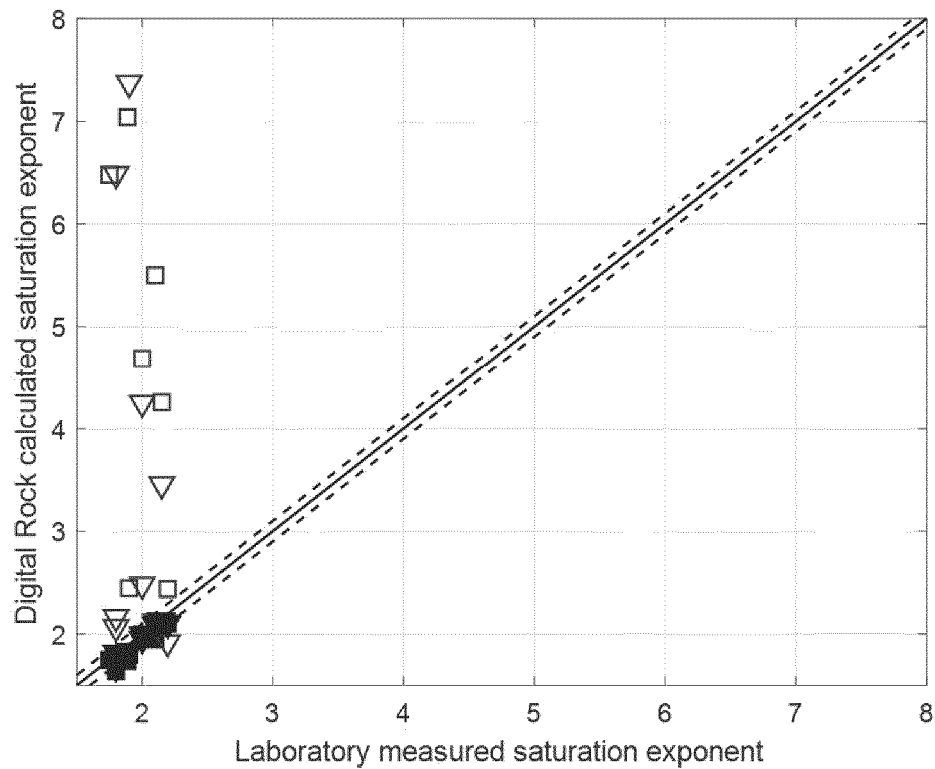
FIGS. 3A-3B are graphical illustrations comparing laboratory-measured values of Archie n with corresponding values of Archie n determined from 3D images of the rock and corresponding corrected values of Archie n.

The saturation exponents were extracted from the I–$S_w$ curves to find that the raw image-derived Archie cementation exponents ($n_t$) were considerable larger than those inferred directly using laboratory measurements, as illustrated in FIGS. 3A and 3B. Upon application of the transforms, in accordance with the present invention, the image-derived exponents (n) agree with those inferred from laboratory measurements within ±0.1. FIG. 3B is depicts the same data as FIG. 3A with shortened axes. Dashed curves denote accuracy of ±0.1

The present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method for estimating hydrocarbon saturation of a hydrocarbon-bearing rock from a resistivity log and a rock image, comprising:

obtaining a measurement for an electrical property for a field having a hydrocarbon-bearing formation;

obtaining a 3D image of a rock from the hydrocarbon-bearing formation in the field, wherein the 3D image is comprised of a plurality of voxels and the 3D image has a resolution;

processing the 3D image to segment the 3D image by selecting each voxel of the 3D image to represent either a pore space in the rock or solid material in the rock;

estimating an image porosity of the rock from the segmented 3D image, the image porosity lacking a sub-resolution porosity of the rock;

determining a corrected porosity adapted to account for the sub-resolution porosity of the rock;

estimating a corrected saturation exponent of the rock from the image porosity and the corrected porosity of the rock; and estimating the hydrocarbon saturation of the hydrocarbon-bearing rock using the corrected saturation exponent and the electrical property measurement.

2. The method of claim 1, further comprising the steps of:

obtaining a measurement of formation porosity along a well bore for the field; and converting the electrical property measurement to a continuous saturation profile using the estimated hydrocarbon saturation and the formation porosity measurement.

3. The method of claim 1, wherein the 3D image of the rock is obtained by x-ray computer tomography.

4. The method of claim 1, wherein the step of estimating the hydrocarbon saturation comprises determining a formation water conductivity and a cementation exponent.

5. The method of claim 1, wherein the rock is obtained from a hydrocarbon-bearing formation comprised of sandstone, carbonate, shale and combinations thereof.

6. The method of claim 1, wherein the corrected porosity of the rock is determined by laboratory measurement.

7. The method of claim 1, wherein the corrected porosity of the rock is determined by deriving a non-wetting liquid capillary pressure curve from the segmented 3D image of the rock; and determining the corrected porosity from the segmented 3D image and the non-wetting liquid capillary pressure curve.

8. The method of claim 7, wherein the non-wetting liquid capillary pressure curve is derived from the segmented 3D image of the rock at pressures of up to an image-limited pressure, where the image-limited pressure is the minimum pressure that can be applied on the non-wetting liquid to overcome the capillary pressure of the narrowest pore throat distinguishable from the segmented 3D image of the rock.

9. The method of claim 1, wherein the 3D image is obtained from a cloud-based tool adapted to store and process 2D projection images from a pore-scale imaging technology.

* * * * *